(No Model.)
B. F. HEINEY.
DOOR CHECK.
No. 418,462. Patented Dec. 31, 1889.
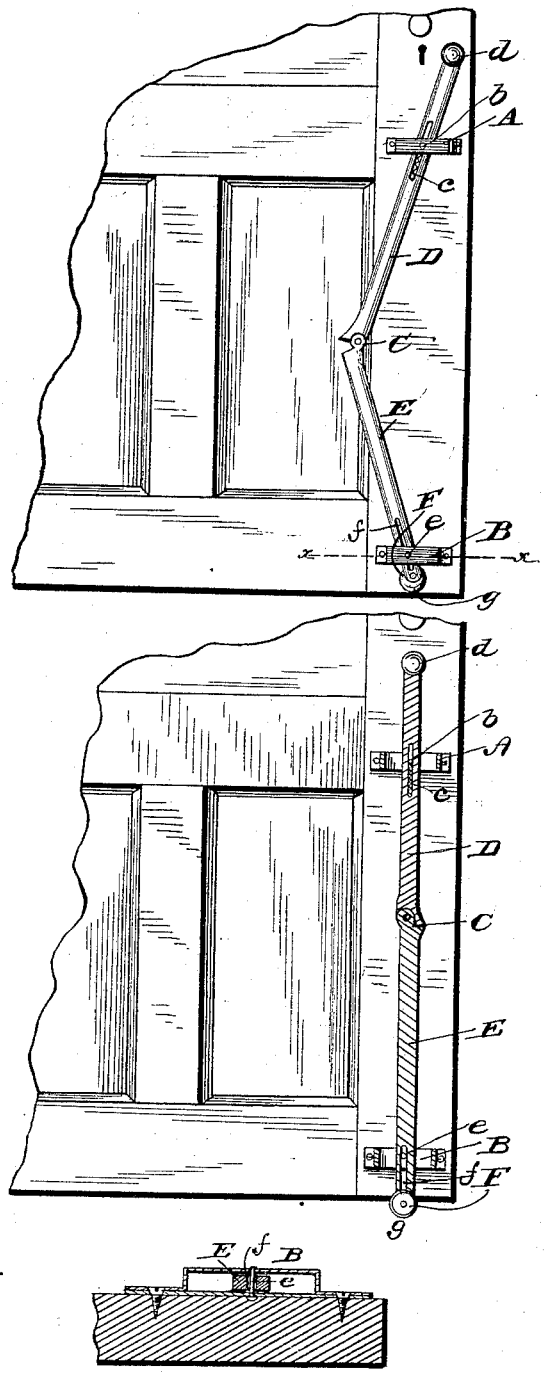

UNITED STATES PATENT OFFICE.

BENJAMIN F. HEINEY OF HUNTINGTON, INDIANA.

DOOR-CHECK.

SPECIFICATION forming part of Letters Patent No. 418,462, dated December 31, 1889.

Application filed August 13, 1889. Serial No. 320,603. (No model.)

*To all whom it may concern:*

Be it known that I, BENJAMIN F. HEINEY, a citizen of the United States, and a resident of Huntington, in the county of Huntington and State of Indiana, have invented certain new and useful Improvements in Door-Stops; and I do hereby declare that the following is a full, clear, and exact description of the invention, which will enable others skilled in the art to which it appertains to make and use the same.

This invention relates to improvements in door-stops, and has for its object the construction of a simple and inexpensive device of that class adapted to be attached to the door itself and to hold the door in any desired position. I attain this object by the mechanism illustrated in the accompanying drawings, in which—

Figure 1 is a perspective view of my improved door-stop attached to a door with the operating-lever raised. Fig. 2 represents a vertical cross-section of the same on a median line, with the lever dropped in a straight line; and Fig. 3 is a longitudinal cross-section on the line $x\ x$ in Fig. 1.

Like letters of reference denote corresponding parts in all the figures.

The letters A and B denote the upper and lower keepers, respectively, in which works a lever having a joint C near its middle part, and each of its parts or portions D and E constituting a lever in itself, said two parts being jointed, so as to form a compound lever. The lever D is fulcrumed on the pin $b$, and has a slot in which is inserted a coiled or rubber spring $c$, which bears against the fulcrum-pin $b$. The upper end of lever D is provided with a knob or handle $d$. In the bottom keeper B is placed the lower lever E, having a vertical slot $f$, which is engaged by the pin $e$. Said lever E has journaled at its lower extremity a broad wheel or roller F, made of metal or other durable material, which may be covered by a rubber tire or rim $g$. The object of the tire or rim $g$ is to prevent the roller from marring or wearing the carpet or floor. Where floors are not provided with carpets or there is no desire to avoid marring them, the rubber tire or rim $g$ may be dispensed with and the roller brought to bear directly upon the floor.

The use and operation of my door-stop is, briefly stated, as follows: The upper keeper A is fastened to the door at or near the lower edge of the lock-rail, and the lower keeper B is fastened near the bottom of the door. When it is desired to open or close the door or to change its position, the lever is moved to take the position shown in Fig. 1. When it is desired to fasten the door open at any point, the lever is brought to a perpendicular, as shown in Fig. 2, and the roller is thereby pressed against the floor or carpet. It will be seen that by the action of the spring $c$ the lever will adapt itself to any unevenness in the floor, and the roller thus made to bear against the floor with sufficient pressure to hold the door in any desired position.

The convenience and advantages of my invention are readily perceived. The joint in the lever may be constructed so that the handle or knob will play either to the right or the left from the perpendicular. The roller may be raised entirely from the floor by moving this knob or handle $d$ in one direction, and when the door is placed in position the friction wheel or roller F is brought in contact with the floor by moving said knob $d$ in the opposite direction.

Having thus described my invention, I claim and desire to secure by Letters Patent of the United States—

1. The herein-described door-stop, comprising the following elements: the keepers adapted to be fastened to the door, the jointed and slotted lever, the upper portion working in the upper keeper and the lower portion working in the lower keeper, and the wheel provided with a yielding rim or tire, combined to operate substantially as described.

2. The herein-described door-stop, comprising the following elements: the keepers adapted to be fastened to the door, the jointed and double-slotted lever, the upper portion of which works in the upper keeper and the lower portion in the lower keeper, the wheel provided with a yielding rim or tire, and the spring inserted in the slot of the upper lever, all constructed and combined to operate substantially as set forth.

In testimony that I claim the foregoing as my own I have hereunto affixed my signature in presence of two witnesses.

BENJAMIN F. HEINEY.

Witnesses:
LUTHER CUMMINGS,
MADORIA D. BRINEMAN.